US006725971B1

(12) United States Patent
Bair

(10) Patent No.: US 6,725,971 B1
(45) Date of Patent: Apr. 27, 2004

(54) PIPE JACK

(76) Inventor: Richard Bair, P.O. Box 1116, Nyland, CA (US) 92257

( * ) Notice: Subject to any disclaimer, the term of this patent is extended or adjusted under 35 U.S.C. 154(b) by 0 days.

(21) Appl. No.: 10/154,133

(22) Filed: May 22, 2002

(51) Int. Cl.[7] .................... E04G 1/00; F16B 7/10; F16M 11/00

(52) U.S. Cl. .................... 182/186.6; 182/182.2; 403/109.8; 248/410

(58) Field of Search .................... 182/186.6, 141, 182/182.2, 181.1, 200–204; 248/410, 297.51, 163.1, 177.1; 52/110, 111; 403/109.1, 109.3, 109.5, 109.7, 109.8, 377

(56) References Cited

U.S. PATENT DOCUMENTS 818,005 A * 4/1906 Turner et al. ............ 182/181.1
1,845,143 A * 2/1932 Friesner .................. 403/109.5
3,065,982 A * 11/1962 Dodd ...................... 248/410
3,734,441 A * 5/1973 Lux ........................ 248/410
3,741,509 A * 6/1973 Kelly ...................... 248/171
4,304,385 A * 12/1981 Farouche et al. ........... 248/410
5,108,066 A * 4/1992 Lundstrom ................. 248/410
5,267,631 A * 12/1993 Mendel .................... 182/107
5,572,835 A * 11/1996 Atkins et al. ............. 248/410

* cited by examiner

*Primary Examiner*—Hugh B. Thompson, II
(74) *Attorney, Agent, or Firm*—Charles H. Thomas

(57) ABSTRACT

An improved load-supporting system for scaffolding, lengths of elongated stock used in the construction industry, tools, and other loads includes a unique system for adjusting the height at which a load is held above a supporting surface. The invention includes a column having a column axis of alignment and at least one sleeve disposed about the column in coaxial sliding engagement therewith. The sleeve has an appendage forming a radially inwardly facing jaw and a jamming washer that surrounds the column and extends into the jaw. The height at which a load is held above a supporting surface is varied by adjusting the relative longitudinal positions of the sleeve and the column. By momentarily forcing the jamming washer into perpendicular alignment relative to the column, incremental adjustment of the relative positions of the sleeve and the column occur. However, with each incremental adjustment, the jamming plate is forced against the wedging surface of the jaw, thus forcing it out of perpendicular alignment with the column and halting any further movement of the load toward the underlying surface until the next incremental adjustment.

17 Claims, 5 Drawing Sheets

PIPE JACK

BACKGROUND OF THE INVENTION

1. Field of the Invention

The present invention relates to a device useful for adjusting the height at which a load is supported by an upright column relative to an underlying surface, and has particular utility for leveling construction scaffolding and for supporting tools and lengthy stock to be machined.

2. Description of the Prior Art

Conventional scaffolding typically involves the use of specially designed scaffold supporting structures that are utilized for only one purpose, which is the support of scaffolding planks. Conventional scaffolding components are bulky, heavy and require significant transportation and storage expenses. As a consequence, most contractors that require the use of scaffolds simply have insufficient storage space to keep the scaffolding when it is not is use. Also, due to the bulky and unwieldy nature of many of the components, many users of scaffolding do not have the proper type of vehicles for transporting the scaffolding units, even if they have a place to store them. As a consequence, most contractors and other entities that require scaffolding are forced to rent the scaffolding components that they need each time they require scaffolding for a construction job. The rental, erection, and dismantling of scaffolding therefore represents a very significant expense to construction workers, pipe fitters, and other tradesmen that require the use of scaffolds.

SUMMARY OF THE INVENTION

A primary object of the present invention is to provide a system for adjusting the height at which a load is supported by an upright column above an underlying surface that does not require lengthy, bulky, special purpose equipment. To the contrary, the present invention involves the use of relatively small, unique fittings and devices which can be utilized with lengths of general purpose pipe or steel rods to create the necessary height adjustment and load leveling support required to perform a particular job. The fittings and couplings employed in the present invention are adaptable for use on general purpose, hollow, steel pipes that are bought in bulk and sold widely for a multitude of different purposes. Furthermore, the pipes that are used to create the scaffolding and other load-supporting, height-adjusting structures is often ultimately utilized on the job, and thus does not require storage.

The use of the set of fittings and couplings according to the invention is not limited to the construction of scaffolding. Quite to the contrary, the load-supporting, height-adjusting devices of the invention are also very useful for supporting and adjusting the height of lengthy articles of stock, such as pipe, gutter stock, lumber, and numerous other lengthy and unwieldy articles which must be supported in a level manner.

The invention is also quite useful as a means for mounting power tools or manually operated tools, since the elevation-adjusting system of the present invention can be fine tuned to a remarkable degree. That is, the support of large, lengthy and bulky loads can be leveled with great precision utilizing the load-supporting system of the invention.

The coupling and fitting components employed according to the invention may be readily disassembled from the pipe stock or rod stock with which they are utilized to conserve room to facilitate shipment and storage of the coupling and fitting members of the invention. When a load-supporting system employing the components of the invention is required, the user simply arranges for the delivery of general purpose pipes or steel rods to the job site, while bringing the unique coupling and fitting members of the invention independently of the lengthy pipe or rod stock that is necessary. The user then simply cuts the stock to the appropriate length at the job site and, in most applications, ultimately utilizes the pipe stock or rod stock for some other purpose once there is no longer a requirement for the load-supporting system of the invention.

In a typical application, a contractor or pipe fitter will order in bulk an appropriate quantity of pipe, such as Schedule 40 steel black pipe, typically between one and two inches in outer diameter. Pipe stock of this type can be purchased at most hardware stores or steel dealers.

If the user has a particular requirement for a tool mount, the user will normally create a load-engaging adapter so that the particular tool or heavy device that the user wishes to support may be engaged by the adapter and supported from beneath by a straight, externally threaded, cylindrical structure which is provided as one of the fitting elements of the invention. That is, the user will typically weld a load-engaging adapter suitable to mount the particular tool involved onto a plate, bracket, support table, or other type of structure forming part of the tool. The user then mounts the tool onto a column provided according to the invention. Once the mounting structure has been joined to the vertically oriented steel rod or pipe, the tool involved is integrated into the load-supporting system of the invention.

The principal unique feature of the invention resides in the novel manner of adjusting the longitudinal position of an upright, load-bearing column relative to a sleeve through which the column passes. In this connection a longitudinally extending appendage is provided on the sleeve to extend longitudinally therefrom at a spaced distance from an upright pipe or rod mounted within the sleeve. This appendage is located outboard of the column and defines a jaw facing the column axis. The appendage is provided with a jaw that faces the pipe or rod supported within the upright sleeve. The jaw is formed with a horizontal radial ledge longitudinally remote from the closest end of the sleeve, and an inclined, wedging or jamming surface that extends from the ledge both radially inwardly and longitudinally toward the end of the sleeve at which the appendage is mounted. The jaw is configured so that the periphery of a strong, flat, annular washer will fit into the jaw when the washer is positioned about the column to be supported. The opening through the washer is only slightly greater than the diameter of the column to be supported, and the periphery of the washer extends into the jaw of the appendage which may project either up or down from the sleeve to which the appendage is attached.

When the washer is oriented perfectly perpendicular to the alignment of the column, relative longitudinal movement between the washer and the column occurs easily. The column can move through the washer opening and through the passageway in the sleeve to which the appendage is attached. However, the application of a load from above to the column will cause the peripheral edge of the washer to bear against the wedging or jamming surface of the appendage, thus tilting the washer out of perpendicular, coaxial alignment with the column. When this occurs, the circular, interior edge of the washer at the washer opening jams against the outer surface of the column and prevents further downward, longitudinal movement of the column relative to the surrounding sleeve or the sleeve relative to the column. The column is thus lodged in a specific longitudinal relationship relative to the sleeve.

For safety purposes, the sleeve is preferably provided with a radial opening that receives a radially inwardly directed set screw or clamping screw. This radial opening in the wall of the sleeve may itself be threaded, but in preferred embodiments of the invention a heavy-duty threaded nut is externally mounted and welded to the outside surface of the sleeve in alignment with the radial opening in the sleeve wall. The use of an external nut provides greater security in engagement of the clamping screw or set screw relative to the sleeve.

In one broad aspect the present invention may be considered to be a device for adjusting the height above an underlying surface at which a vertical column of uniform outer cross-sectional area and having a longitudinal axis of alignment supports a load. The device is comprised of a hollow sleeve, an outboard longitudinal extension from the sleeve and a jamming plate, which is typically a heavy-duty flat steel washer.

The hollow sleeve defines an enclosed passageway therethrough that conforms in shape to the outer cross-sectional area of the column so that the sleeve is disposed coaxially about the column in sliding relationship therewith. The outboard longitudinal extension from the sleeve is spaced outwardly from the column and defines a jaw directed toward the axis of alignment. The jaw is formed with a horizontal ledge having proximal and remote ends relative to the longitudinal axis, and a jamming surface that extends from the remote end of the jaw both longitudinally toward the sleeve and inwardly toward the axis of alignment.

The jamming plate has a laterally enclosed opening therethrough encompassing the vertical column therewithin. The jamming plate has a peripheral edge that projects into the jaw between the ledge and the jamming surface thereof. The jamming plate is movable longitudinally along the column when it is perpendicular to the longitudinal axis of the column. On the other hand, the jamming plate jams against the outer surface of the column when forced out of perpendicular alignment relative to the axis of column alignment.

The jaw includes a radial ledge located remote from the sleeve and the wedging surface is angled toward the sleeve and toward the column. The flat, annular jamming plate is disposed about the column and has a periphery that extends into the jaw. When the jamming plate is oriented perpendicular to the column, it is possible to longitudinally adjust the relative position of the sleeve and the column. One of the two components, either the sleeve or the column, is coupled to the load bearing down from above, while the other of these components is supported from a stand located upon an underlying surface above which the load is to be supported.

The invention may be described with greater clarity and particularity with reference to the accompanying drawings.

DESCRIPTION OF THE EMBODIMENTS

Figure 1:
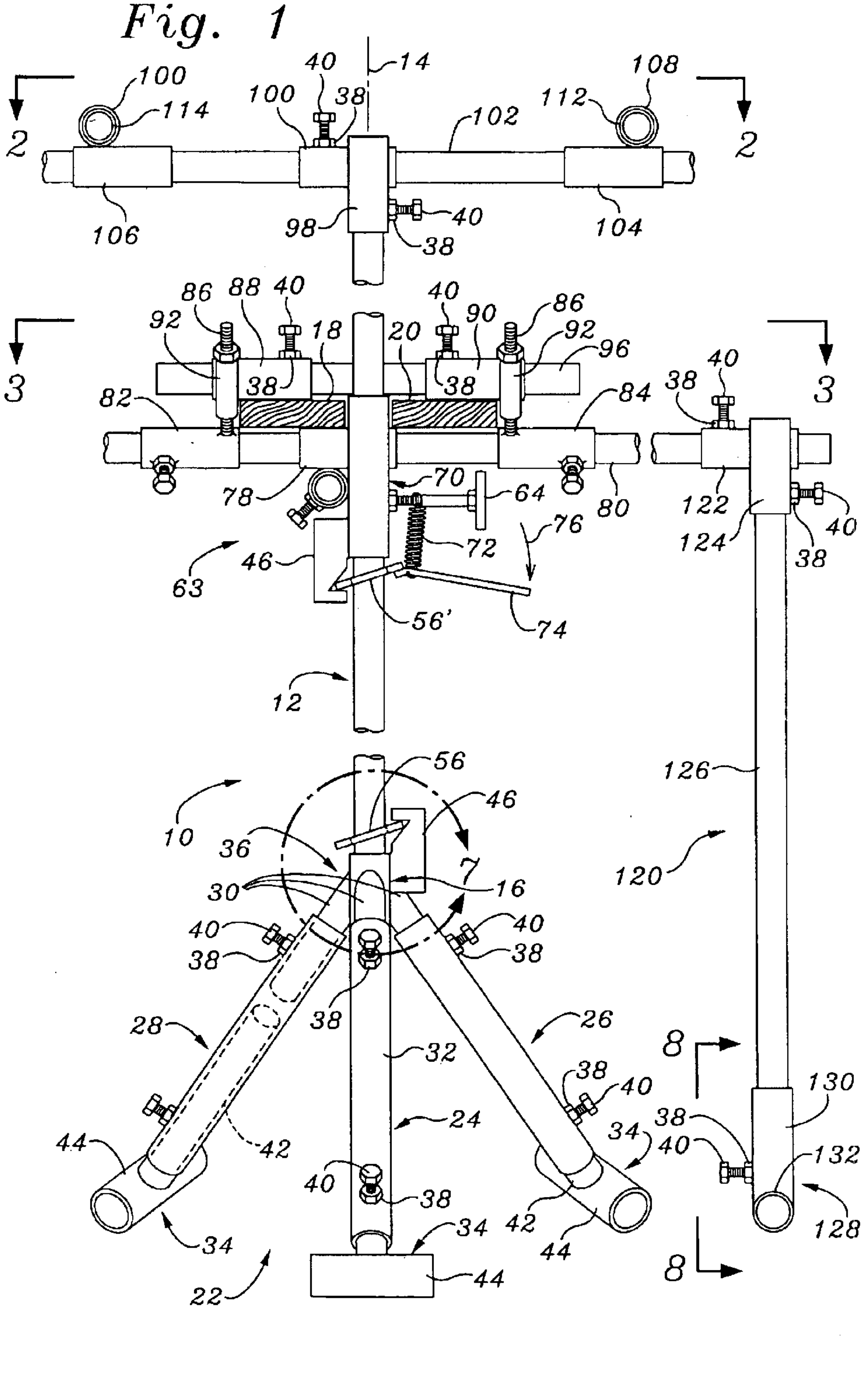
FIG. 1 is a front elevational view illustrating the construction of a scaffolding support according to the invention.
Figure 2:
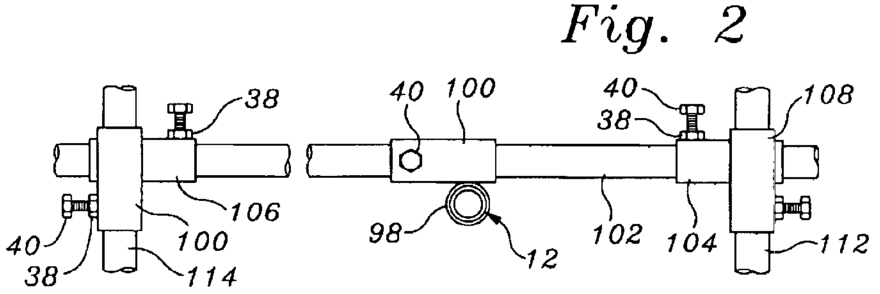
FIG. 2 is a bottom plan sectional view taken along the lines 2—2 of FIG. 1.

FIG. 1 illustrates generally at 10 one of several upright supporting standards of the type utilized in a typical scaffolding support system. In the load-supporting and adjusting system 10 there is a main, upright, vertical column 12 having a longitudinal column axis of alignment indicated at 14. The column 12 may be formed of one and one-quarter inch OD black steel pipe having a wall thickness of one-eighth of an inch. The hollow pipe column 12 may extend upwardly to a height of only two or three feet in some applications. However, in the scaffolding support system depicted in FIG. 1, the pipe column 12 will typically extend upwardly a considerable distance, perhaps twenty or thirty feet.

The load-supporting and adjusting system 10 of the invention illustrated also employs a first lowermost sleeve 16 disposed coaxially about only a portion of the column 12, more specifically, only about a six inch long portion of the column 12 at or near the lower end of the column 12. The sleeve 16 may be formed of Schedule 40 black steel pipe having an outer diameter of one and one-half inches. Like all of the pipe employed in the load-supporting and adjusting system 10, the sleeve 16 has a wall thickness of one-eighth of an inch. The first, lowermost sleeve 16 may be about six inches in length. With a pipe column 12 and a first, lowermost sleeve 16 constructed in this manner, the sleeve 16 and pipe 12 may be moved in longitudinally reciprocal fashion relative to each other, but only if they remain in close coaxial alignment. The height at which a load, transmitted through the scaffolding support planks 18 and 20 is held above an underlying supporting surface is varied by adjusting the relative longitudinal positions of the sleeve 16 and the column 12, as will hereinafter be described.

The sleeve 16 is supported in a vertical orientation above an underlying support, such as the ground or pavement upon which the load-supporting and adjusting system 10 is erected by a stand indicated generally at 22. The stand 22 is configured as a tripod having legs 24, 26, and 28 that diverge from the sleeve 16 to support the sleeve 16 above the underlying surface. The legs 24, 26, and 28 are all adjustable in length.

Each of the legs 24, 26, and 28 is formed of an upper leg segment 30, a hollow leg shank 32, and a T-shaped foot structure 34. The upper leg segments 30 are each formed of a length of black Schedule 40 steel pipe having an outer diameter of one and one-quarter inches and a length of about seven and three-quarter inches. The upper leg segments 30 intersect the sleeve 16 at an angle of about forty-five degrees relative thereto. The upper leg segments 30 are equally spaced one hundred twenty degrees apart from each other about the circumference of the sleeve 16 and are all welded securely to the outer surface of the sleeve 16. Once the upper leg segments 30 have been welded to the sleeve 16, the resultant unitary structure forms an inverted tree, indicated generally at 36.

The hollow leg shanks 32 are each formed of twenty-two-inch long sections of back steel pipe having an outer diameter of one and one-half inches and a wall thickness of one-eighth inch. A pair of linearly aligned radial bores are defined through the wall of each leg shank 32 at a distance about three inches from each of the extremities thereof. These radial bores are each about three-eighths inches in diameter and are surmounted on the outer surface of the hollow leg shank sections 32 by five-sixteenths inch thread diameter steel nuts 38, which are welded to the outer surfaces of the hollow leg shanks 32. The nuts 38 preferably have a thread length of about nine-sixteenths of an inch. Five-sixteenths inch, hex head clamping screws 40 are threadably engaged in each of the nuts 38.

The T-shaped feet 34 are each formed of intersecting lengths of one and one-quarter inch OD black steel pipe which intersect each other at right angles. Specifically, each of the feet 34 is formed with a long section 42 about fifteen and three-quarters inches in length and a short section 44, about six inches in length. The lower extremities of the long sections 42 are welded to the centers of the outer surfaces of the short sections 44.

As illustrated in FIG. 1, the upper leg members 30 and the long sections 42 of each of the feet 34 extend telescopically into the opposite ends of the hollow leg shank members 32. It should be noted that the long section 42 of the foot 34 projects well up into the hollow leg shank 32 so as to maximize both the strength of each of the legs 24, 26, and 28, and to minimize any possible misalignment between the leg shanks 32 and the long sections 42 of the feet 34.

The length of each of the legs 24, 26, and 28 is adjustable by varying the extent to which the upper leg members 30 and the long sections 42 of the feet 34 extend into the opposing ends of the hollow leg shank sections 32. The tripod leg construction with the feature of adjustment of leg length allows the tripod 26 to accommodate variations in elevation of the underlying surface upon which the tripod 26 is supported. Once each of the legs 24, 26, and 28 has been adjusted to the appropriate length, the clamping screws 40 that are threadably engaged in the nuts 38 are advanced into the radial bores through the walls of the leg shanks 32 to immobilize the upper leg members 30 and the long sections 42 of the feet 34 relative to the hollow leg shanks 32. Torque on the clamping screws 40 should not exceed twenty-five pounds, as a torque of forty-five pounds will stretch the clamping nut threads.

Figure 7:
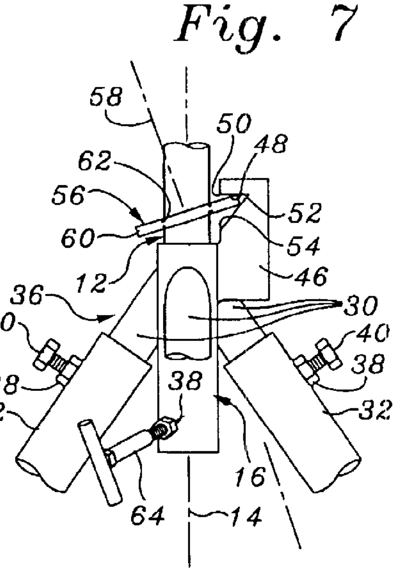
FIG. 7 is a front elevational detail indicated at 7 in FIG. 1.
Figure 6:
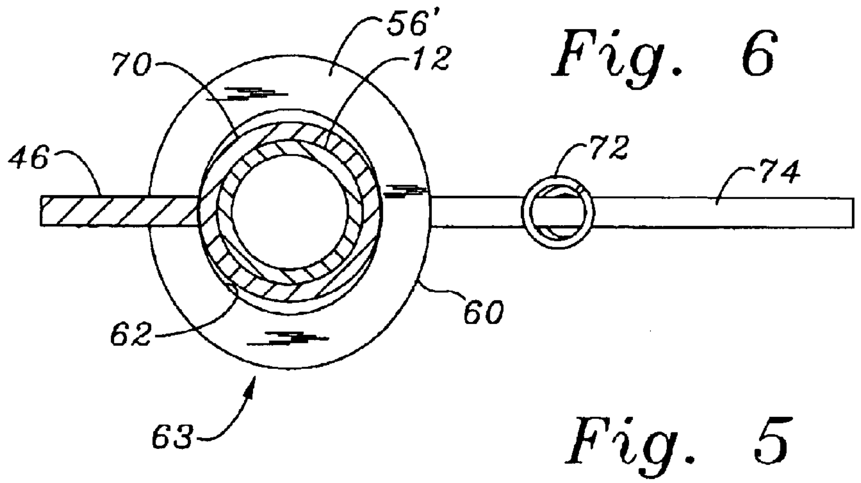
FIG. 6 is a top plan sectional detail taken along the lines 6—6 of FIG. 4.

FIG. 7 illustrates the tree 36 and the manner of adjustment of the height at which a load is supported on the upright column 12 relative to the underlying support upon which the tripod 26 is mounted. As illustrated in FIG. 7, in addition to the sleeve 16 and the upper leg members 30, the tree 36 also has a flat, plate-like appendage 46 that. is secured by welding to the lowermost sleeve 16 and extends longitudinally therefrom in a vertical, upward direction. The appendage or extension 46 is a flat plate of steel, having a generally rectangular configuration, and is about four inches in height, about one and three-eighths inches in width, and one-eighth of an inch in thickness. The appendage or extension plate 46 is located outboard of the column 12 and is in radial alignment relative to the longitudinal axis of alignment 14.

Within its structure, the plate 46 defines a jaw facing the column 12 and in alignment with its axis 14. The jaw includes a horizontal, radial ledge 48 located longitudinally remote from the sleeve 16. The radial ledge 48 has a radial inboard extremity 50 and a radial outboard extremity 52. The ledge 48 may be about three-quarters of an inch in length as measured between its radially proximal, inboard extremity 50 and its radially distal, outboard extremity 52. The straight, horizontal ledge 48 is preferably located about nine-sixteenths of an inch from the upper extremity of the extension plate 46. The other part of the jaw is formed by a wedging or jamming surface 54 that slopes from the outboard extremity 52 of the ledge 48 radially inwardly toward the column 12 and its axis of alignment 14 and longitudinally toward the upper end of the lowermost sleeve 16. The jamming or wedging surface 54 is linear and forms an acute angle of about forty degrees with the ledge 48.

A jamming plate in the form of a flat, annular steel washer 56 is provided as the operative component for restricting relative movement between the column 12 and the first, lowermost sleeve 16. The jamming washer 50 is an annular, heavy-duty steel washer one-eighth of an inch in thickness with an inner diameter of one and three-eighths inches and an outer diameter of three inches. Such a washer will support a vertical load of 1,500 pounds. The circular, central opening in the jamming washer 56 is just large enough to allow the jamming or wedging washer 56 to move freely along the column 12 so that it may be longitudinally positioned relative thereto when the jamming washer axis of orientation 58 and the column axis of alignment 14 are longitudinally aligned with each other. That is, the jamming or wedging washer 56 is freely movable along the column 12 when oriented perpendicular to the column 12 and its axis of alignment 14.

The jamming washer 56 has a peripheral edge 60 that projects outwardly from the pipe column 12 and into the jaw of the extension plate 46 between the ledge 48 and the jamming surface 54 thereof. If the jamming washer 56 is oriented perpendicular to the column 12 so that its axis of orientation 58 coincides with the longitudinal axis 14 of column 12, the column 12 may be raised upwardly or lowered downwardly relative to the lowermost sleeve 16. However, the jamming washer 56 can only be aligned perpendicular to the column 16 if the net longitudinal force along the column axis 14 is zero or in an upward direction to overcome the gravitational force of the load applied through the scaffold planks 18 and 20. On the other hand, if there is a longitudinal downward force on the pipe column 12, that force will cause the jamming surface 54 to tilt the jamming washer 56, thereby lodging its inner surface 62 against the outer surface of the pipe column 12. This causes the pipe column 12 to bind within the sleeve 16 so that further downward movement of the pipe column 12 relative to the sleeve 16 is impossible until or unless the load on the column 12 from above is removed or overcome by an opposite, opposing force.

Although the resultant binding force between the pipe column 12, the jamming washer 56, and the inner surface of the sleeve 16 is sufficient to prevent the descent of the column 12 relative to the tree 36, the sleeve 16 is preferably provided with a radial opening in its wall and a clamping screw 64 that is threadably engaged relative to the sleeve 16 and is directed into the radial opening. More specifically, another nut 38 is welded on the outer surface of the sleeve 16 in coaxial alignment with the radial opening in the sleeve wall so that the threaded shank of the clamping screw 64 is engaged throughout the length of nut 38.

The clamping screw 64 differs from the clamping screws 40 in that it has a generally T-shaped configuration so as to provide a handle 66 that affords greater leverage for advancing the clamping screw 64 radially inwardly into contact with the outer surface of the pipe column 12 within the cylindrical passageway formed within the lowermost sleeve 16.

From the first, lowermost sleeve 16 the pipe column 12 extends vertically upwardly to an appropriate height just beneath the load applied through the planks 18 and 20. At this location there is another load height adjustment assembly 63 that employs a second upper sleeve 70 disposed about a limited length of the column 12. The upper sleeve 70 is formed of black pipe steel having a outer diameter of one and five-eighths inches. The sleeve 70 is about eight inches in length. The sleeve 70 also has a longitudinal extension or appendage plate 46 identical to that welded to the lowermost sleeve 16. However, the outboard extension plate 46 that is welded to the outer surface of the upper sleeve 70 extends vertically downwardly from the sleeve 70, rather than upwardly therefrom, so that the jamming or wedging surface 54 thereof extends at an inclination upwardly toward the sleeve 70, as well as radially inwardly toward the column 12 and its axis of alignment 14. The upper sleeve 70 is also provided with another jamming washer 56', which serves as a jamming plate, identical to that utilized in conjunction with the lowermost sleeve 16.

The load height adjustment assembly 63 at the upper sleeve 70 differs significantly from that at the tree 36 in several significant respects, however. Specifically, a coil spring 72, placed under tension, is provided to act upon the jamming washer 56' to urge it out of perpendicular alignment relative to the column 12. Also, the jamming washer 56' is provided with a lever arm 74 that is attached to the periphery of the jamming plate 56' diametrically opposite the outboard extension plate 46 relative to the column 12. The lever arm 74 is formed of a three-eighths inch diameter steel rod, about six inches in length, the inboard tip of which is bent slightly and welded to the underside of the jamming washer 56'.

A three-eighths inch diameter radial bore is defined through the wall of the upper sleeve 70 about two inches above the lower edge of the sleeve 70 and diametrically opposite the extension plate 46. Another nut 38 is welded to the outside surface of the upper sleeve 70 in coaxial alignment with the radial bore therethrough. The coil spring 72 has loops at its opposing end. The upper loop of the spring 72 is hooked about the shank of another clamping screw 64, while the lower loop of the spring 72 is hooked about the lever arm 74 proximate its attachment to the jamming washer 56'.

The spring 72 is stretched somewhat under tension to pull the lever arm 72 upwardly toward the clamping screw 64, thereby twisting the jamming washer 56 relative to the pipe column 12 so that its inner edge 62 lodges against the upper surface of the pipe column 12 and the peripheral edge 60 of the jamming washer 56' jams against the jamming surface 54 of the upper, downwardly directed outboard extension plate 46. The spring 72 also functions to pull the lever 74 into direct diametrical opposition to the extension 46.

With this arrangement the sleeve 70 can be lowered relative to the column 12 in stepwise increments by pressing down upon the lever arm 74 to overcome the force of the spring 72. This pivots the opposite point on the peripheral edge 60 of the jamming washer 56' relative to the jamming surface 54 to bring the jamming washer 56' into perpendicular alignment relative to the pipe column 12. At this point, the weight applied through the planks 18 and 20 forces the upper sleeve 70 downwardly along the outside of the pipe column 12. However, as soon as the sleeve 70 drops a fraction of an inch, the jamming washer 56' is again twisted out of coaxial alignment with the pipe axis 14, thereby jamming against the outer surface of the pipe 12 and halting the descent of the upper sleeve 70 after movement of only a fraction of an inch.

It is a relatively easy matter to lower the load applied by the planks 18 and 20 stepwise in this fashion by repeatedly operating the lever 74 downwardly in the direction indicated by the directional arrow 76 in FIG. 1. The jaw of the upper extension plate 46 serves as a stepping jaw that faces the column 12 and is formed with a radial, upwardly facing ledge 48 located remote from the sleeve 70. The stepping jaw is formed with a downwardly facing wedging surface 54 that extends from the radial outboard extremity 52 of the upwardly facing ledge 48 and slopes both inwardly toward the column 12 and upwardly toward the second sleeve 70. The jamming washer 56' thereby serves as a jack plate having an opening therethrough just large enough to allow the jack plate washer 56' to move freely along the column 12 when oriented perpendicular thereto. The lever 74 serves as jack handle or lever.

The jack plate washer 56' is located about the column 12 so as to project outwardly therefrom into the stepping jaw of the extension 46 attached to the upper sleeve 70. The jack plate washer 56' has a peripheral portion 60 at its outer edge. A section of this peripheral portion 60 terminates between the inboard and outboard extremities 50 and 52 of the upwardly facing ledge 48 in the upper height adjustment assembly 63. The jack handle 74 is attached to an opposite section of the peripheral portion 60. The jack handle 74 extends radially away from the column 12. The spring 72 is coupled between the jack handle 74 and the clamping screw 64 that is engaged with the second sleeve 70 to urge the jack handle 74 upwardly in counterclockwise rotation, as viewed in FIGS. 1 and 4.

Figure 4:
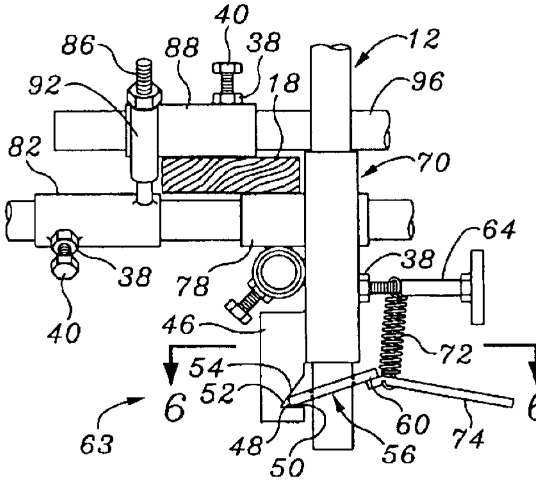
FIG. 4 is a front elevational detail taken along the lines 4—4 of FIG. 3.

As indicated in FIGS. 1, 4, and 7, bores are defined radially through both the first, lower sleeve 16 and the second, upper sleeve 70. Externally mounted, internally threaded nuts 38 are provided on both of the sleeves 16 and 70 in alignment with the respective bores therein. The sleeves 16 and 70 are both provided with radially directed T-shaped clamping screws 64 that are engaged in the externally mounted nuts 38 on the sleeves 16 and 70. These radially directed clamping screws 64 are directed into the respective bores in the sleeves 16 and 70, whereby manually twisting the handles 66 of the clamping screws 64 completely immobilizes both of the sleeves 16 and 70 relative to the column 12.

The upper height adjustment assembly 63 differs from the lower height adjustment assembly depicted in FIG. 7 in another important respect. Specifically, the upper sleeve 70 is provided with a first, hollow, horizontal cross member tube 78 that is rigidly and permanently secured and oriented at right angles to the upper sleeve 70 in tangential arrangement therewith. That is, the horizontal cross member tube 78 is firmly welded to the outer surface of the sleeve 70 at a location spaced above the clamping screw 64 that is directed radially inwardly toward the column 12.

The horizontal cross member tube 78 is formed of black steel pipe having an outer diameter of one and five-eighths inches and is about four inches in length. A horizontal load support member 80 in the form of a length of black steel pipe is provided and extends through the first cross member tube 78. The horizontal load support member 80 may be of considerable length, depending upon the height of the load-supporting structure 10 and the weight to be supported. The stability of the underlying surface is also a factor in determining the length of the horizontal load support member 80.

In any event, the horizontal load support tube 80 is rigidly, but releaseably secured within the first cross member tube 78 by means of a nut 38 welded to the outer surface of the horizontal cross member tube 78 at a radial bore through the wall thereof. Another hex head clamping screw 40 is engaged with the nut 38 on the wall of the horizontal cross member tube 78. Once the horizontal load support tube 80 has been moved longitudinally to its desired position, it is immobilized relative to the cross member tube 78 by tightening the clamping screw 40 that is engaged with the nut 38 of the cross member tube 78. The horizontal load support member 80 thereby extends a considerable distance to support loads and transmit those loads to the column 12 through the horizontal cross member tube 78 and the upper sleeve 70. Together the horizontal cross member tube 78 and the horizontal load support pipe 80 form a load coupling member that transmits a load downwardly through the column 12 to the underlying surface supporting the tripod 26.

As illustrated in FIG. 1, the load on the load-support system 10 is comprised of at least a pair of flat, elongated planks 18 and 20, one on each side of the column 12. The planks 18 and 20 are oriented perpendicular to both the column 12 and to the cross member tube 78. The planks 18 and 20 preferably reside in contact with the pipe column 12, and in any event should not be spaced in excess of twelve inches from the pipe column 12.

To stabilize the planks 18 and 20, the load-supporting and adjusting system 10 is provided with at least a pair of lower, cylindrical, annular lock-down collars 82 and 84. Each of the lower lock-down collars 82 and 84 is formed of a four-inch length of one and five-eighths outer diameter steel pipe. Like the other releaseable immobilizing structures, the lower lock-down collars 82 and 84 are provided with radially oriented three-eighths-inch diameter bores through their walls and five-sixteenths-inch ID nuts 38 welded on their outside surfaces in coaxial alignment with those bores. Hex head clamping nuts 40 are provided for each of the lower lock-down collars 82 and 84.

The lower lock-down collars 82 and 84 are constructed as mirror images of each other and each is provided with an externally threaded stud 86 having a pitch diameter of five-eighths of an inch. Each of the studs 86 is about four and a half inches in length. The studs 86 project radially outwardly from their respective lock-down collars 82 and 84 proximate the ends thereof that are located closest to and just outboard of the planks 18 and 20. The studs 86 have proximal ends that are directed into radial bores in the walls of the lower lock-down collars 82 and 84 and are rigidly secured thereto by welds around their proximal bases where they intersect the lower lock-down collars 82 and 84. The distal ends of the studs 86 project upwardly and at an angle of about sixty-five degrees relative to horizontal, as illustrated in FIG. 5.

The load stabilizing mechanism of the load supporting system 10 is further comprised of at least a pair of upper, cylindrical, annular lock-down collars 88 and 90. The upper lock-down collars 88 and 90 are also formed of one and five-eighths inch OD steel pipe about four inches in length. Like the lower lock-down collars 82 and 84, the upper lock-down collars 88 and 90 are provided with nuts 38 aligned with radial bores through their respective walls and have clamping screws 40 engaged therein.

The upper lock-down collars 88 and 90 are each provided with a hollow barrel 92 oriented tangentially relative to the cylindrical, annular structures of the collars 88 and 90. The barrels 92 have an outer diameter of seven-eighths of an inch and are about two and three-eighths inches in length. The barrels 92 are welded to the outer surfaces of the cylindrical, tubular portions of the upper lock-down collars 88 and 90.

Figure 3:
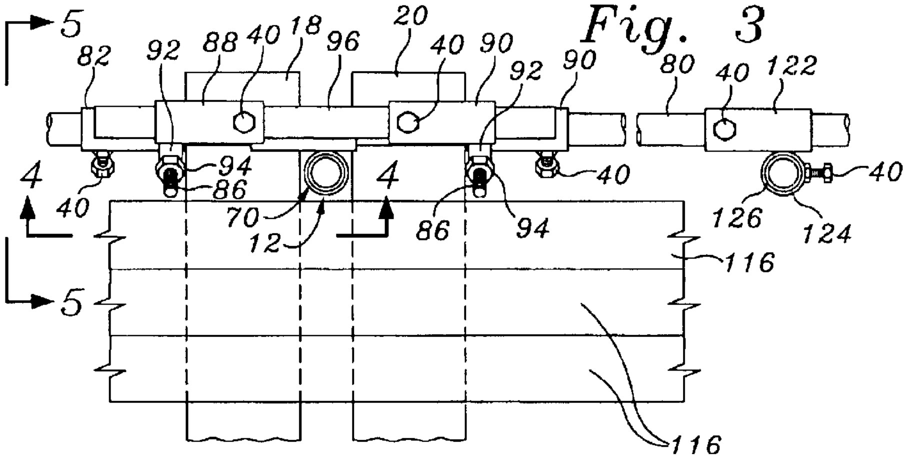
FIG. 3 is a top plan sectional view taken along the lines 3—3 of FIG. 1.
Figure 5:
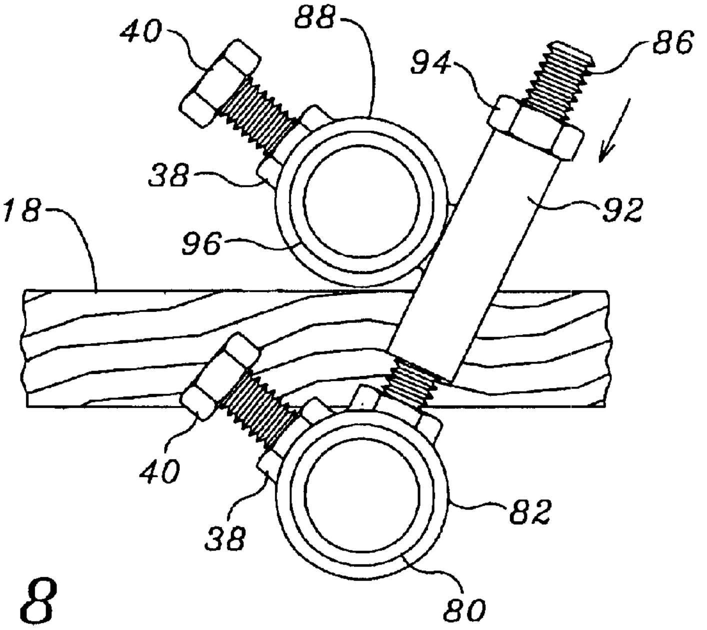
FIG. 5 is a side elevational detail taken along the lines 5—5 of FIG. 3.

As illustrated in FIGS. 1, 3, and 5, the upper lock-down collars 88 and 90 are located above the level of the planks 18 and 20 and are in substantially vertical alignment with the lower lock-down collars 82 and 84. The upper lock-down collars 88 and 90 are oriented so that the studs 86 of the lower lock-down collars 82 and 84 extend coaxially through the barrels 92 of the upper lock-down collars 88 and 90. The upper lock-down collars 88 and 90 are spaced transversely apart from each other and, in the embodiment illustrated, bear directly downwardly upon the planks 18 and 20.

As best illustrated in FIG. 5, the load stabilizing mechanism includes three-quarter inch ID steel lock-down nuts 94 that are threadably engaged on the distal ends of the lower lock-down collar studs 86 that project beyond the barrels 92 of the upper lock-down collars 88 and 90. The lock-down nuts 94 are tightened so as to tightly clamp the planks 18 and 20 between the lower lock-down collars 82 and 84 and the upper lock-down collars 88 and 90.

To provide even greater rigidity to the scaffolding system, the upper lock-down collars 88 and 90 are coaxially aligned with each other. In addition, there is a horizontal lock-down pipe 96 that extends coaxially through the cylindrical openings in the upper lock-down collars 88 and 90. The clamping screws 40 in the upper lock-down collars 88 and 90 may be tightened to immobilize the horizontal lock-down pipe 96 relative to the collars 88 and 90 and relative to the entire load-supporting and adjusting system 10. Nevertheless, by utilizing the clamping screws 40 that are engaged in the threaded nuts 38 welded to the outer surfaces of the upper lock-down collars 88 and 90, the horizontal lock-down pipe 96 is rigidly, but releaseably secured to both the upper lock-down collars 88 and 90 and also the lower lock-down collars 82 and 84.

The embodiment of the load-supporting and adjusting system 10 of the invention depicted in FIG. 1 is comprised of a third tubular sleeve 98 that is disposed about and rigidly secured to a small portion of the pipe column 12 above both the lowermost sleeve 16 and the upper sleeve 70. The third sleeve 98 bears a second, hollow, horizontal cross member 100 that is permanently and rigidly secured thereto by welding. The cross member 100 is oriented at right angles relative to the third sleeve 98 and resides in tangential contact relationship therewith. The third tubular sleeve 98 and the second, hollow, horizontal cross member 100 are both formed of four-inch sections of one and five-eighths inch OD black steel pipe. Both the third sleeve 98 and the second, hollow, horizontal cross member tube 100 are provided with radial bores with nuts 38 welded to their outside surfaces in coaxial alignment with the radial bores, as well as hex head clamping screws 40, as previously described in connection with many of the other component members of the invention.

In the load-supporting and adjusting system 10, which is just one unit of the total scaffolding support, the third sleeve 98 is located about forty-two inches above the second sleeve 70. Also, a horizontal, tubular handrail support member 102 is provided. The horizontal handrail support member 102 is formed of one and one-quarter inch OD black steel pipe and extends outwardly from the pipe column 12 in both directions. In some scaffolding installations there will be a requirement for scaffolding handrails on only one side of the structure. More typically, however, and as illustrated in FIG. 1, the horizontal handrail support member 102 extends horizontally in both directions from the second, hollow, horizontal cross member tube 100.

At a distance of about eighteen to twenty-four inches on the right-hand side of the pipe column 12, as viewed in FIG. 1, there is a fourth tubular sleeve 104 disposed about the handrail support member 102. At the same distance on the left-hand side of the pipe column 12 there is a fifth tubular sleeve 106, also disposed about the handrail support pipe 102. The fourth and fifth sleeves 104 and 106 are formed in mirror image to each other. The fourth tubular sleeve 104 is provided with a hollow handrail holder 108 secured tangentially by welding at right angles relative to the fourth sleeve 104 at right angles relative thereto. Similarly, another handrail holder 110 is secured by welding atop the fifth tubular sleeve 106. The handrail holder 110 is also oriented at right angles and tangentially relative to the fifth tube 106. The sleeves 104 and 106 and the handrail supports 108 and 110 are each formed of black steel pipe having an OD of one and five-eighths inches and each have a length of about four inches.

Handrails 112 and 114 extend through the handrail holder 108 and 110, respectively, and are rigidly and releaseably secured thereto by means of clamping screws 40 that extend through radial bores through the walls of the handrail holders 108 and 110 and are engaged in steel nuts 38 welded surmounted to the outside surfaces thereof, of the type previously described. Similarly, the fourth sleeve 104 is rigidly, but releaseably secured to the horizontal handrail support member 102 by means of a clamping screw 40 that is threadably engaged in a nut 38 aligned with a radial bore through the fourth sleeve 104. Likewise, a radial bore is formed through the wall of the fifth sleeve 106 and a nut 38 is welded to the outer surface of the fifth sleeve 106 in coaxial alignment therewith. Another clamping screw 40 is threadably engaged in the nut 38 of the fifth sleeve 106 and is used to rigidly, but releaseably secure the fifth sleeve 106 to the horizontal handrail support member 102.

In the embodiment illustrated the planks 18 and 20 form one support for a platform comprised of a plurality of flat planks 116 that are laid cross-wise atop the load transmitting planks 18 and 20 and oriented perpendicular thereto, as illustrated in FIG. 3. Where a platform of planks 116 is to be constructed, there should be a separate load-supporting and adjusting system 10 located at each of the four corners of the platform. The planks 116 have been omitted from the other drawing figures for clarity of illustration of the other components of the invention.

Depending upon the height of the load-supporting and adjusting system 10, an outrigger 120 may be necessary to provide lateral stability to the load-supporting and adjusting system 10. When using only two load-supporting and adjusting systems 10 for scaffolding over four feet in elevation an outrigger 120 will normally be utilized.

The outrigger 120 is comprised of an outrigger sleeve 122 rigidly and releaseably secured to the horizontal load support member 80 by means of a radial bore, a welded nut 38, and a hex head clamping screw 40, as previously described in conjunction with other components of the invention. There is a hollow, tubular, annular outrigger holder 124 rigidly and permanently secured at right angles relative to the outrigger sleeve 122. The outrigger sleeve 122 and the outrigger holder 124 are both formed of one and five-eighths inch OD black steel pipe, about four inches in length. The outer surfaces of the outrigger sleeve 122 and the outrigger holder 124 contact each other tangentially and at right angles and are welded together to form a secure, rigid, permanent connection. The outrigger holder is also provided with a rigid, releaseable clamping mechanism involving a radial bore, a nut 38, and a hex head clamping screw 40, as previously described.

The outrigger 120 is further comprised of an outrigger support tube 126 formed as an elongated length of vertical black steel pipe which has an outer diameter of one and one-quarter inches. The length of the outrigger support tube 126 depends upon the height of the horizontal load support pipe 80 above the underlying surface upon which the load supporting system 10 is deployed.

Figure 8:
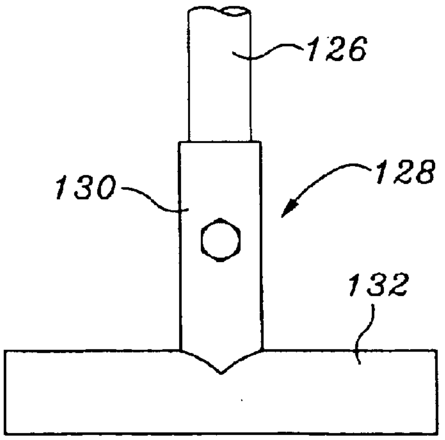
FIG. 8 is a side elevational detail taken along the lines 8—8 of FIG. 1.

The vertical outrigger support member 126 extends vertically downwardly and terminates within the vertical tube of a T-shaped outrigger base 128, best illustrated in FIG. 8. The outrigger base 128 has a central, upwardly projecting pipe 130 that intersects a lower horizontal pipe 132. The pipe 130 is welded to the outer surface of the horizontal pipe 132 midway along the length of the lower horizontal pipe 132. Both of the pipes 130 and 132 are formed of black steel pipe having an outer diameter of one and five-eighths inches. Both of the pipes 130 and 132 are about six inches in length.

A radial bore is formed through the wall of the vertical pipe 130 of the outrigger base 128 about midway along its length and a nut 38 is welded to its outer surface in alignment with the radial bore. A hex head clamping screw 40 is engaged in the nut 38 of the vertical tube 130 of the outrigger base 128 and is employed to rigidly, but releaseably clamp the vertical outrigger support member 126 to the outrigger base 128.

The outrigger 120 may be located a considerable distance, perhaps ten feet or more, from the main pipe column 12 of the load-supporting and adjusting system 10. The outrigger 120 is provided to increase the lateral stability of the load-supporting and adjusting system 10 and may or may not be necessary, depending upon the height and weight of the load upon the pipe column 12. While a single outrigger 120 has been illustrated in the drawings, it is to be understood that outriggers 120 could be provided on both sides of the main pipe column 12.

The load-supporting and adjusting system 10 illustrated in FIGS. 1 through 8 is just one of several load-supporting systems employed to support scaffolding. Depending upon the weight the pipe column 12 must bear, load-supporting systems 10 may be spaced apart every twenty to thirty feet. Also, the arrangement of the load-support systems 10 deployed will depend upon the work area involved.

The invention is not limited for use for scaffolding, however. Quite to the contrary, the load-supporting system of the invention has a multiplicity of different uses and applications.

Figure 9:
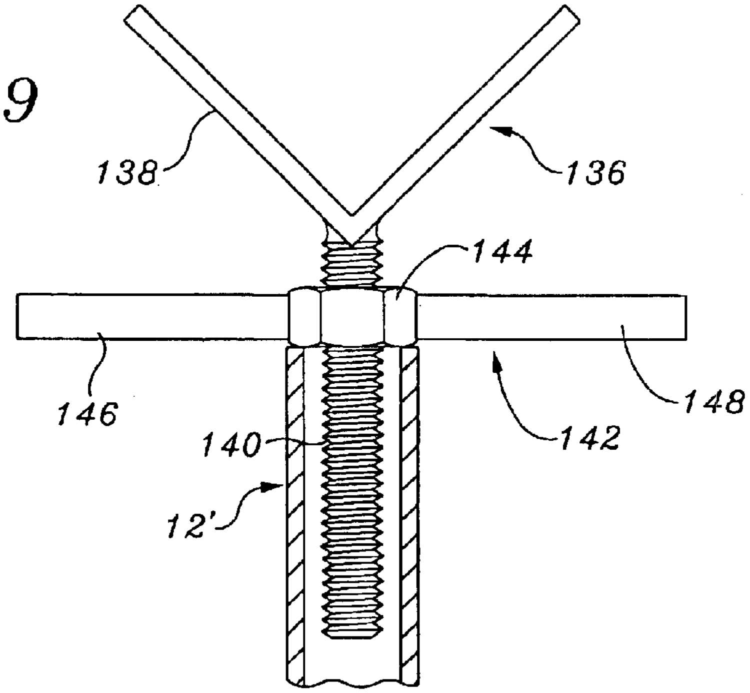
FIG. 9 is a front elevational detail that illustrates an alternative embodiment of the height-adjusting device of the invention to that illustrated in FIG. 1.
Figure 11:
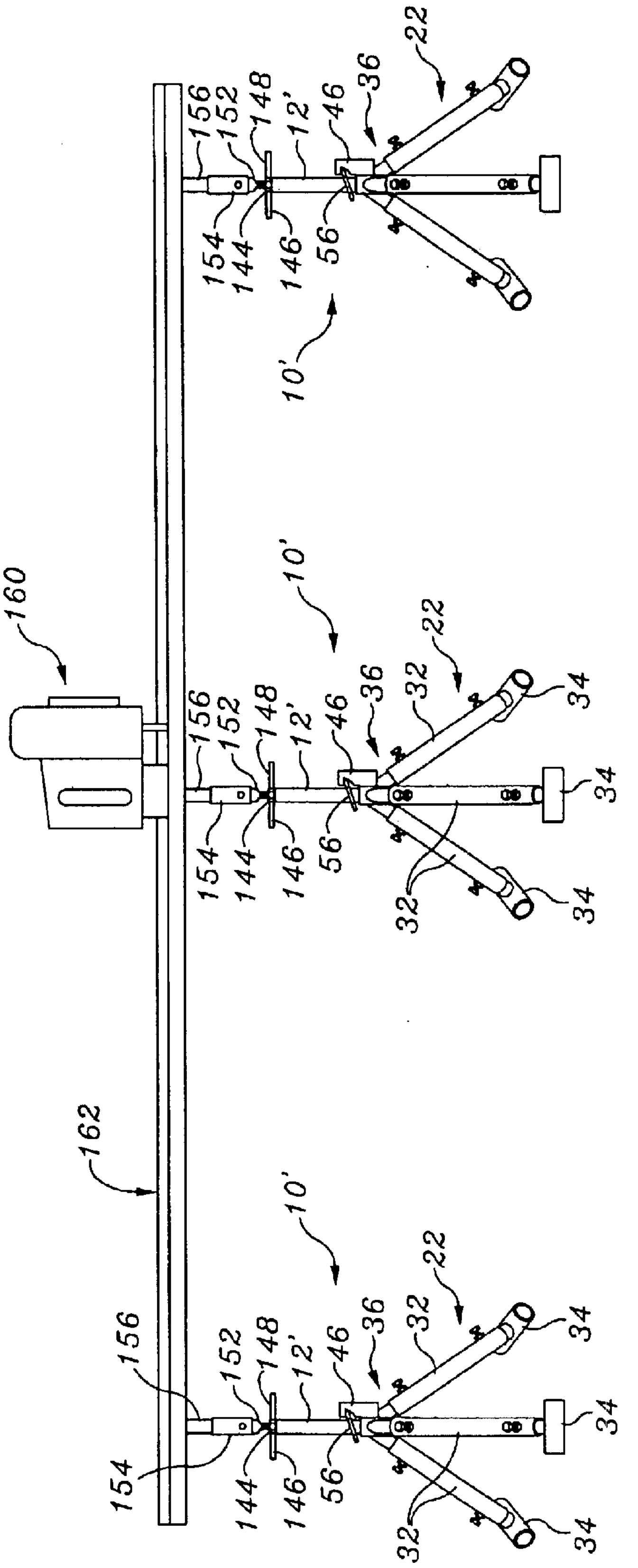
FIG. 11 is a front elevational view showing embodiments of the invention as shown in FIG. 10 used to support a tool and elongated pieces of work stock.

For example, FIG. 9 illustrates a variation of the load-supporting and adjusting system which is utilized to support lengths of steel pipe above an underlying surface. In FIG. 9 only the upper end of the pipe column 12' has been illustrated, although it is to be understood that there is a tripod 26 with a tree 36 including the upwardly directed appendage 46 and jamming washer 56 illustrated in FIG. 7 at the lower end of the column 12', as shown in FIG. 11.

In the application of FIG. 9, however, none of the components of the load-supporting and adjusting system 10 above the lowermost height-adjusting system depicted in FIG. 7 are necessary. To the contrary, the pipe column 12' terminates in a simple horizontal cut. However, the modification illustrated in FIG. 9 includes a load-engaging member 136 that has a load-engaging adapter 138 at its upper extremity, and a straight, externally threaded, vertically oriented, cylindrical structure, which in the embodiment shown is a steel rod 140, projecting downwardly from the load-engaging adapter 138.

The load-engaging adapter 138 is a V-shaped steel trough configured to support one or more elongated lengths of steel pipe in its upwardly facing V-shaped recess. The load-engaging adapter 138 is formed as an angle piece from a steel plate measuring about four inches by eight inches and about one-quarter of an inch in thickness. The steel plate is bent in half so that each of the legs of the angle forming the load-engaging adapter 138 are four inches long. The legs meet at right angles to each other as illustrated. In a larger version of the same load-engaging adapter the legs of the V-shaped angle piece are each six inches long and the adapter is formed of a piece of steel initially six inches by twelve inches, but bent in half so that the legs are each six inches long.

In either case the load-engaging member 136 is provided with the same externally threaded steel rod 140, which may have a diameter of seven-eighths of an inch and a length of about fourteen and a half inches. As illustrated in FIG. 9, the externally threaded rod 140 extends downwardly loosely into the upper end of the hollow pipe column 12'.

The load-engaging member 136 serves as a fine adjustment coupling, since it is used in combination with a wing nut 142. The wing nut 142 is formed of a hex head nut 144 having a pair of handles 146 and 148 extending radially therefrom in diametric opposition to each other. The handles 146 and 148 are each formed as steel rods five-eighths of an inch in diameter and about five inches in length.

The load-supporting device illustrated in FIG. 9 may be initially adjusted by manipulating the jamming washer 56 relative to the tree 36 which is located at the lower end of the pipe column 12' in the manner illustrated and previously described in conjunction with FIG. 7. Once the V-shaped trough 138 is at the approximate desired height, the height can be fine tuned by manually rotating the wing nut 144 relative to the load-engaging member 136 using the handles 146 and 148. Rotation of the wing nut 144 in one direction will raise the V-shaped trough 138 incrementally, while rotation of the wing nut 144 in the opposite direction will lower it. The wing nut 144 is located atop and rests upon the upper end of the hollow pipe 12' and is threadably engaged on the externally threaded rod 140. The wing nut handles 146 and 148 project radially beyond the outer circumference of the upper end of the pipe 12'. Thus, in the system illustrated in FIG. 9, a coarse height adjustment of the supported load can be performed utilizing the height adjustment mechanism illustrated in FIG. 7, and the fine adjustment may be performed utilizing the invention components at the upper end of the pipe 12' illustrated in FIG. 9.

Figure 10:
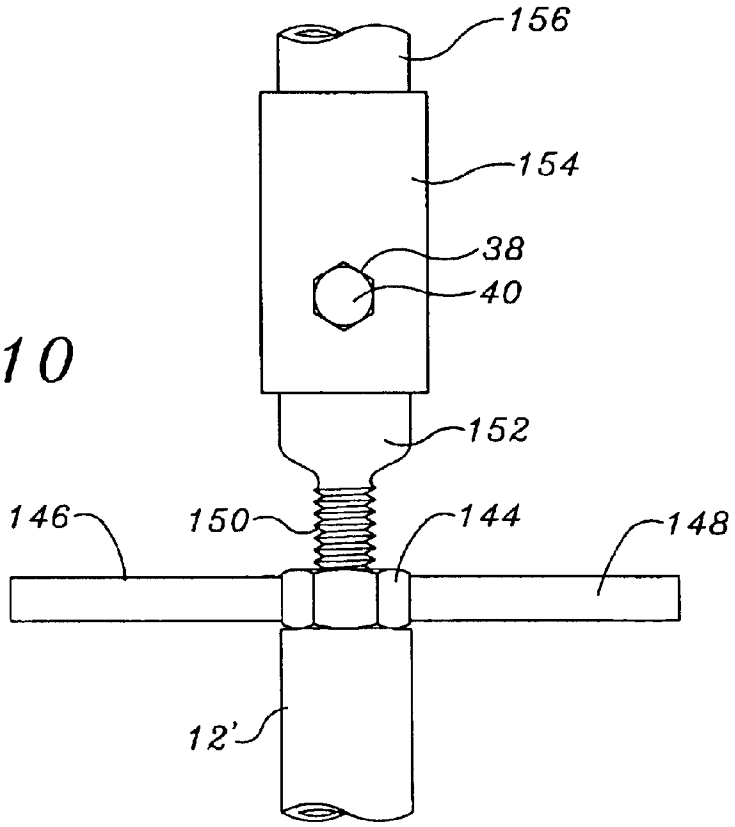
FIG. 10 is a front elevation detail that illustrates a modification of the embodiment illustrated in FIG. 10.

FIG. 10 illustrates another alternative modification of the embodiment of the invention shown in FIG. 9. Like the embodiment of FIG. 9, the load-supporting system illustrated in FIG. 10 also employs the pipe 12', only the upper extremity of which is illustrated in FIG. 10. The lower end of the pipe 12' terminates in the load height adjustment mechanism shown in FIG. 7.

The height adjustment mechanism of FIG. 10 also employs the same wing nut 144 with handles 146 and 148 as in the embodiment of FIG. 9. The wing nut 144 is engaged with a threaded rod 150 that extends down from a different load-engaging adapter, which in this embodiment is a six-inch length of one and one-quarter OD black steel pipe 152. The pipe 152 extends upwardly and is encompassed within a surrounding adapter sleeve 154, which is a six-inch length of one and five-eighth OD pipe. The adapter 154 has a radial bore defined through its wall surmounted by a nut 38 welded to the outside surface thereof, and a clamping screw 40 of the type previously described.

The adapter sleeve 154 is suitable for receiving a tool, table, or some other implement that has a short length of one and one-quarter inch pipe 156 projecting downwardly from its underside. The mounting arrangement illustrated in FIG. 10 may be utilized to support any number of different tools; implements, tables, or heavy devices at precise elevations, as illustrated in FIG. 11.

By way of example, FIG. 11 illustrates the manner in which a metal chop saw 160 is mounted to a load-supporting and adjusting system 10' according to the invention. The metal chop saw 160 has a flat steel plate at its bottom to which a steel tube 156 has been welded to extend vertically downwardly. The metal chop saw 160 is located adjacent pieces of elongated metal stock, indicated generally at 162, which are to be cut. For the cuts in the stock 162 to be performed at right angles, it is important for the ends of the metal stock 162 to be supported at the same elevation as the center of the stock, which lies on the table of the chop saw 160.

To this end other units of load-supporting systems as depicted in FIG. 10 are employed. As illustrated in FIG. 11, a separate unit of the load-supporting and adjusting system 10' is utilized at each of the ends of the stock 162. The elevation of each end of the stock 162 may be adjusted separately, by manipulation of the handles 146 and 148 of the wing nut 144 employed therewith. Thus, the system of FIG. 11 provides a means for individually adjusting the height of different portions of the load bearing down on the several load-supporting units 10'.

The drawings illustrate only of the many applications of the load-supporting system of the invention. As is evident, the entire structure of both the load-supporting systems 10' and the load-supporting and adjusting system 10 can be disassembled down into very small components, excepting the elongated lengths of pipe which may be ordered in bulk lots and utilized for other purposes once the load-supporting devices 10 or 10' are no longer necessary.

That is, each of the component elements of the load-supporting devices 10 and 10' that are secured to other components by the releaseable clamping screws 40 may be disconnected from each other and stored in a very small volume. For example, all of the reusable components of the load supporting structure 10 illustrated in FIG. 1 may be detached from each other and stored in a box that measures only seven and a half inches by thirteen inches by twenty-five inches. These reusable components of the invention include all of the components of the tripod 26, which are detached from each other wherever connected by the clamping screws 40; the tree 36, including the extension 46; the jamming washer 56; the upper load-adjusting assembly 63, which includes the second sleeve 70 with the first hollow, horizontal cross member tube 78, and also the clamping screw 64, the jack plate washer 56' and the spring 72. In addition, all of the lock-down sleeve assemblies, the handrail coupling assemblies, and the outrigger coupling assemblies may likewise be stored in the same small box at the same time.

Undoubtedly, numerous variations and modifications of the invention will become readily apparent to those familiar with load leveling and lifting devices. For example, the load-supporting assembly 10 may be utilized to support a tree house for use by children, where the structure of the tree in which the tree house is built may be of questionable strength. Numerous other applications of the invention are also possible. Accordingly, the scope of the invention should not be construed as limited to the specific embodiment depicted and described, but rather is defined in the claims appended hereto.

I claim:

1. A device for adjusting the height above an underlying surface at which a vertical column of uniform outer cross-sectional area and having a longitudinally axis of alignment supports a load comprising a hollow sleeve defining an enclosed passageway therethrough that conforms in shape to said outer cross-sectional area of said column so that said sleeve is disposed coaxially about said column in sliding relationship therewith, an outboard longitudinal extension from said sleeve that extends vertically downwardly from said sleeve and is spaced outwardly from said column and which defines a jaw directed toward said axis of alignment and formed with a horizontal ledge having proximal and remote ends relative to said longitudinal axis and a jamming surface that extends from said remote end of said jaw both longitudinally toward said sleeve and inwardly toward said axis of alignment, and a flat jamming plate having a laterally enclosed opening therethrough encompassing said vertical column therewithin and which is movable longitudinally along said column when said jamming plate is perpendicular to said longitudinal axis and which jams against the surface of said column when forced out of perpendicular alignment relative to said axis of alignment, and said jamming plate has a peripheral edge that projects into said jaw between said ledge and said jamming surface thereof, and a spring acting upon said jamming plate to urge it out of perpendicular alignment relative to said column.

2. The device according to claim 1 wherein a radial opening is defined through said hollow sleeve and further comprising a clamping screw threadably engaged relative to said sleeve and directed into said radial opening.

3. The device according to claim 1 further comprising a lever arm rigidly attached to said jamming plate at a location relative to said column diametrically opposite said outboard extension, and said spring is under tension and is coupled to act between said lever arm and said sleeve.

4. The device according to claim 3 wherein a radial opening is defined through said sleeve on a side thereof diametrically opposite said outboard extension, and further comprising a clamping screw threadably engaged relative to said sleeve and directed into said radial opening, and said spring has opposing ends, one of which is attached to said lever arm and the other of which is attached to said clamping screw.

5. The device according to claim 1 further comprising a load coupling member rigidly secured to said sleeve for engaging a load to be supported by said column.

6. The device according to claim 1 wherein said jamming plate is a flat annular steel washer.

7. The device according to claim 1 further comprising a stand having legs that diverge from said sleeve to support said sleeve above said underlying surface, and said legs are adjustable in length.

8. A device for adjusting the height at which a load is supported on an upright column relative to an underlying surface comprising:

a first tubular sleeve disposed about only a portion of said column and which is longitudinally adjustable relative to said column, an appendage rigidly secured to said first sleeve and extending longitudinally therefrom and defining a jaw facing said column and formed with a radial ledge spaced radially from said column and located remote from said sleeve wherein said ledge terminates at radial inboard and radial outboard extremities and said jaw is formed with a wedging surface that extends from said radial outboard extremity of said ledge and slopes both inwardly toward said column and longitudinally toward said first sleeve, and an annular wedging plate having an opening therethrough just large enough to allow said wedging plate to move freely along said column when oriented perpendicular thereto and said wedging plate is located about said column so as to project outwardly therefrom and into said jaw and said wedging plate has a peripheral edge that terminates between said inboard and outboard extremities of said ledge.

9. The device according to claim 8 wherein said appendage extends downwardly from said first sleeve, and further comprising a stand having legs that diverge from said first sleeve to support said sleeve and said column above said underlying surface, and further comprising a second tubular sleeve disposed about only another portion of said column and above said first sleeve, and a second appendage rigidly secured to said second sleeve to project downwardly therefrom and said second appendage defines a stepping jaw facing said column and formed with a radial, upwardly facing ledge spaced radially from said column and located remote from said sleeve wherein said ledge terminates at radial inboard and radial outboard extremities, and said stepping jaw is formed with a downwardly facing wedging surface that extends from said radial outboard extremity of said upwardly facing ledge and slopes both inwardly toward said column and upwardly toward said second sleeve, and an annular jack plate having an opening therethrough just large enough to allow said jack plate to move freely along said column when oriented perpendicular thereto and said jack plate is located about said column so as to project outwardly therefrom and into said stepping jaw, and said jack plate has a peripheral edge portion that terminates between said inboard and outboard extremities of said upwardly facing ledge, and an opposite edge portion, a jack handle attached to said opposite edge portion of said jack plate to extend radially away from said column, a spring coupled between said jack handle and said second sleeve to urge said jack handle upwardly, and a load coupling member rigidly secured to said second sleeve for engaging said load supported by said column.

10. The device according to claim 9 wherein bores are defined radially through both said first and second sleeves and externally mounted, internally threaded nuts are permanently fastened on both of said sleeves in alignment with said bores therein, and said sleeves are both provided with radially directed clamping screws engaged in said externally mounted nuts on said sleeves and directed into said bores, whereby said clamping screws are releaseably advanced into said bores to completely and releaseably immobilize both of said sleeves relative to said column.

11. The device according to claim 9 wherein said load coupling member is comprised of at least a first hollow, horizontal cross member tube that is rigidly and permanently secured to and oriented at right angles to said second sleeve, and a horizontal load support member extending through said first cross member tube and rigidly and releaseably secured to said first cross member tube and atop which said load rests.

12. The device according to claim 11 wherein said load is comprised of at least a pair of flat, elongated planks, one on each side of said column and said planks are oriented perpendicular to both said column and said cross member tube, and further comprising at least a pair of lower cylindrical annular lock-down collars disposed about and rigidly and releaseably secured to said load support member and located outboard of said planks and having studs with threaded ends projecting radially and upwardly therefrom, at least a pair of upper, cylindrical, annular lock-down collars having hollow barrels oriented tangentially relative thereto, and wherein said studs of said lower lock-down collars extend coaxially through said barrels of said upper lock-down collars and said upper lock-down collars are located above the level of said planks and transversely spaced apart from each other, and lock-down nuts threadably engaged on the ends of said lower lock-down collar studs and tightened against said barrels so as to tightly clamp said planks between said lower and upper lock-down collars.

13. The device according to claim 12 wherein said upper lock-down collars are coaxially aligned with each other and further comprising a horizontal lock-down pipe extending through said upper lock-down collars and rigidly and releaseably secured to said upper lock-down collars.

14. The device according to claim 13 wherein each of said lock-down collars has a radial opening defined therethrough and further comprising a separate clamping screw threadably engaged relative to each of said lock-down collars and directed into said radial openings thereof to releaseably immobilize said lock-down collars relative to each other and relative to said horizontal load support member.

15. The device according to claim 11 further comprising: a third tubular sleeve disposed about and rigidly secured to only a portion of said column and above said second sleeve, and at least a second hollow horizontal cross member tube that is permanently and rigidly secured to and oriented at right angles to said third sleeve, a horizontal handrail support member extending through said second horizontal cross member tube and transversely from said column, at least a fourth tubular sleeve disposed about and rigidly secured to said handrail support and having a hollow, handrail holder rigidly and permanently secured at right angles relative thereto, and a handrail extending through said handrail holder and rigidly and releaseably secured thereto.

16. The device according to claim 11 further comprising an outrigger sleeve rigidly and releaseably secured to said horizontal load support member, and said outrigger sleeve has a hollow outrigger holder rigidly and permanently secured at right angles relative thereto and said outrigger holder is oriented in a vertical disposition, a vertical outrigger support member rigidly and releaseably held by said outrigger holder and extending vertically downwardly therefrom toward said underlying surface, and an outrigger base supported upon said underlying surface and rigidly and releaseably coupled to said vertical outrigger support member.

17. The device according to claim 8 wherein said appendage extends vertically upwardly and said column is a hollow pipe having an open upper end, and further comprising a stand supporting said sleeve above said underlying surface, a fine adjustment coupling having a load-engaging adapter and a straight, externally threaded, cylindrical structure projecting downwardly from said load-engaging adapter and loosely into said upper end of said hollow pipe, and a wing nut located atop said upper end of said hollow pipe and threadably engaged on said externally threaded structure of said fine adjustment coupling, and said wing nut has handles that project radially beyond said upper end of said pipe.

* * * * *